United States Patent [19]

Hattori et al.

[11] Patent Number: 4,749,265
[45] Date of Patent: Jun. 7, 1988

[54] ZOOM LENS

[75] Inventors: Jun Hattori; Tsunefumi Tanaka, both of Kanagawa, Japan

[73] Assignee: Canon Kabushiki Kaisha

[21] Appl. No.: 628,491

[22] Filed: Jul. 6, 1984

[30] Foreign Application Priority Data

Jul. 14, 1983 [JP] Japan ................................ 58-128974

[51] Int. Cl.$^4$ .......................... G02B 15/16; G02B 9/64
[52] U.S. Cl. .................................................. 350/427
[58] Field of Search ..................... 350/427, 428, 423

[56] References Cited

U.S. PATENT DOCUMENTS

| | | | |
|---|---|---|---|
| 4,240,700 | 12/1980 | Ogawa et al. | |
| 4,449,791 | 5/1984 | Terasawa et al. | 350/427 |
| 4,456,341 | 6/1984 | Kato | 350/427 |
| 4,506,958 | 3/1985 | Imai | 350/423 |
| 4,515,446 | 5/1985 | Takahashi et al. | 350/427 |
| 4,527,867 | 7/1985 | Fujioka et al. | 350/427 |
| 4,571,033 | 2/1986 | Kato et al. | 350/427 |

Primary Examiner—John K. Corbin
Assistant Examiner—Rebecca D. Gass
Attorney, Agent, or Firm—Toren, McGeady & Associates

[57] ABSTRACT

A zoom lens including, from front to rear, a positive first component, a negative second component, a positive third component and a fourth component which is stationary during zooming. In some zoom lenses, a fifth component may be positioned behind the fourth component, in which, during zooming, the fourth component is movable and the fifth component is stationary. The separation between the first and second components and the separation between the second and third components varies to effect zooming. The third component is composed of, from front to rear, two positive lenses, a negative meniscus lens having a divergent cemented surface convex towards the front, and a positive lens with its rear surface having the stronger curvature. Minimization of bulk and size and an increase of the image magnification range of the zoom lens is achieved while preserving correction if aberrations.

6 Claims, 6 Drawing Sheets

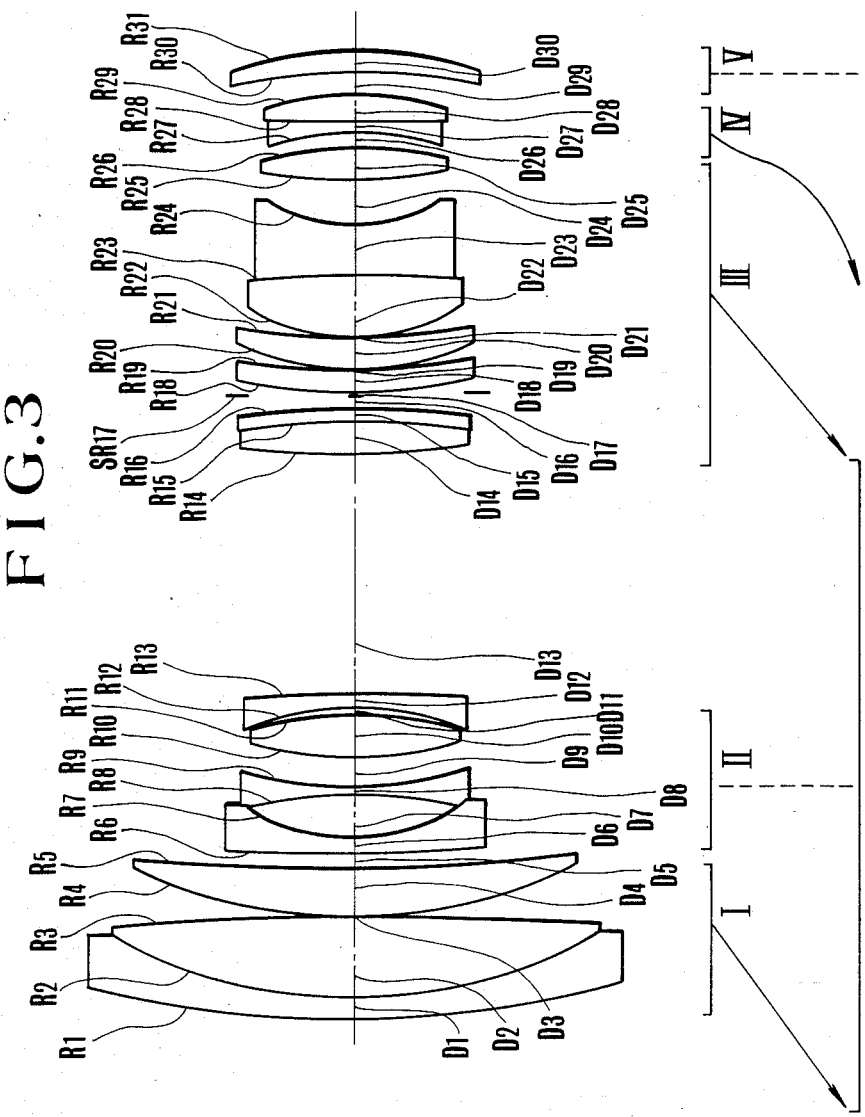

FIG.4(a)
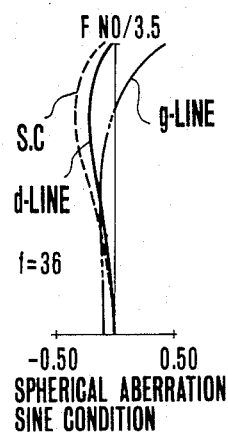
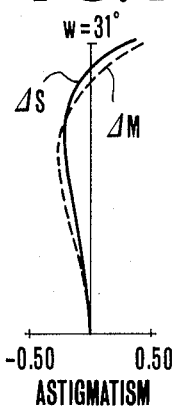
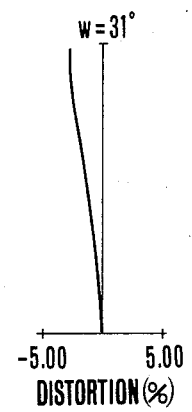
FIG.4(b)
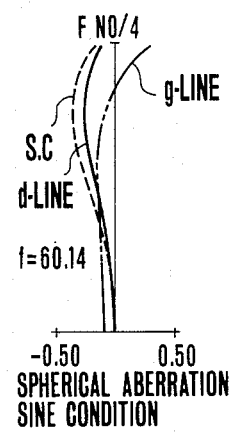
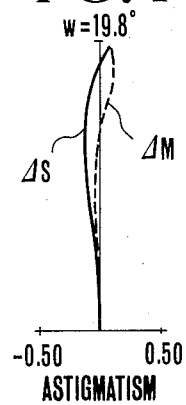
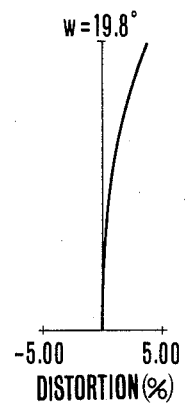
FIG.4(c)
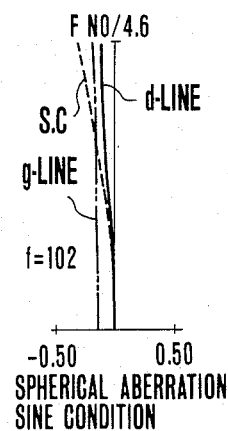
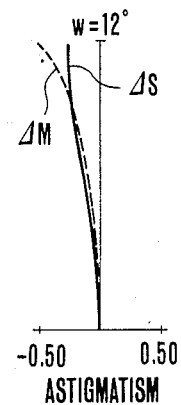
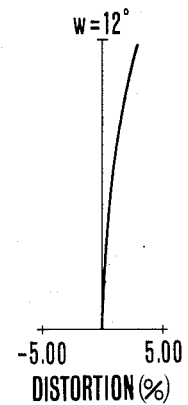

FIG.5(a)
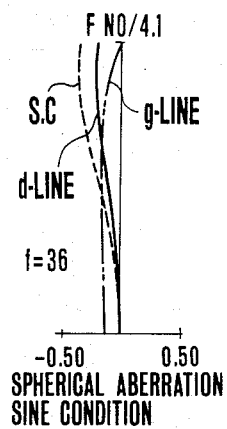
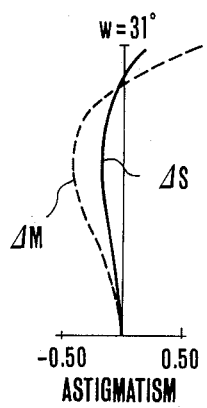
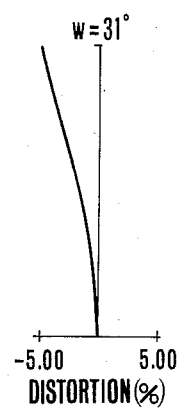
FIG.5(b)
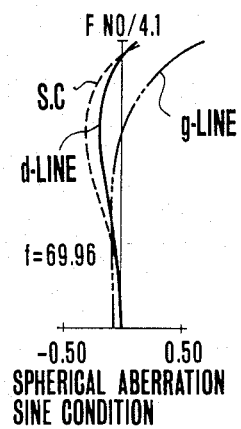
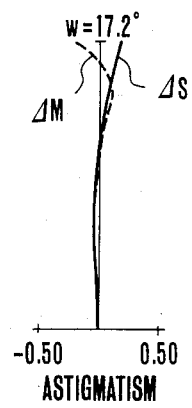
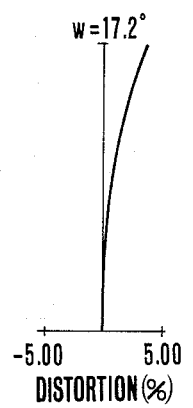
FIG.5(c)
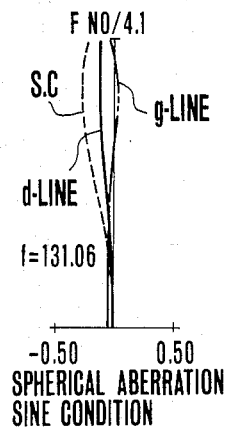
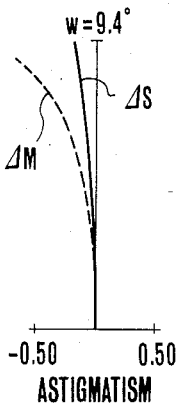
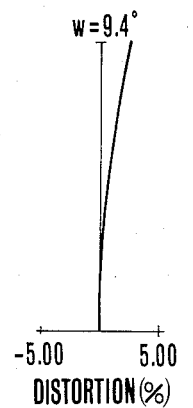

FIG. 6(a)
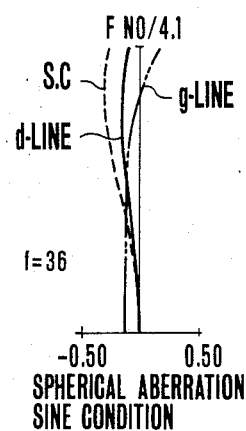
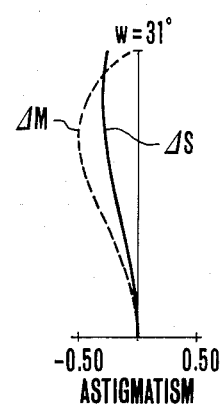
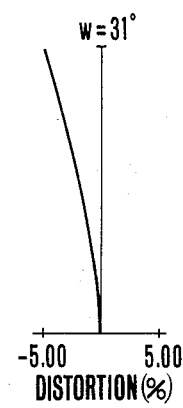
FIG. 6(b)
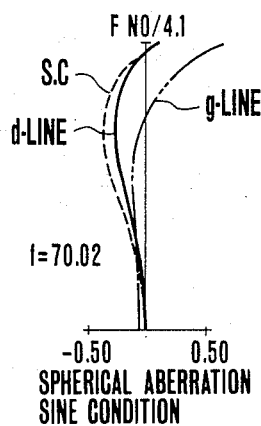
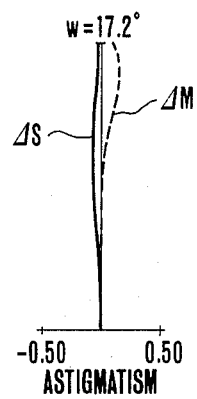
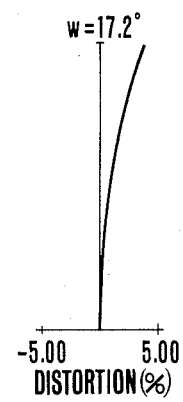
FIG. 6(c)
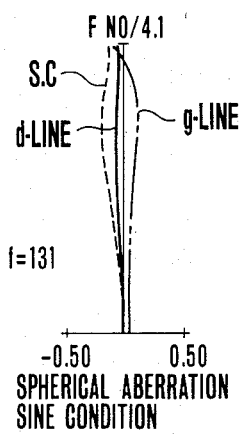
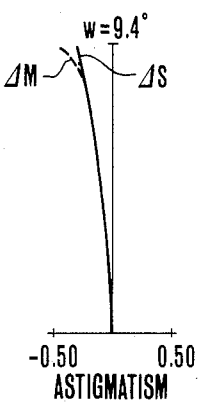
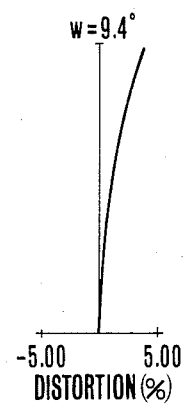

ZOOM LENS

BACKGROUND OF THE INVENTION

1. Field of the Invention

This invention relates to a zoom lenses and more particularly to high magnification range zoom lenses suited to still cameras.

2. Description of the Prior Art

Examples of the typical prior art zoom lenses include the so-called two-component zoom lens, which includes two components of negative and positive powers, and the so-called four-component zoom lens, which includes from components having, from front to rear, a focusing portion, a variator portion, a compensator portion and a relay portion.

Where a zoom lens of extended zooming or image magnification range is desired, the use of the two-component zoom lens makes it difficult to correct all aberrations, particularly spherical aberration for the telephoto positions. Use of the four-components zoom lens, on the other hand, necessitates a marked strengthening of the refractive power of the zoom portion. Accordingly, it is difficult to correct all aberrations in a balanced system. Moreover, the longitudinal length of the entire system and the diameter of the front component must be increased. Thus, the prior art two and four component zoom lenses were not suited for the purpose.

Many new zoom lenses have been proposed in recent years, one of which uses at least three components to share the magnification power varying effect to obtain a higher magnification range.

SUMMARY OF THE INVENTION

An object of the present invention is to provide a zoom lens having an extended range and minimum bulk and size utilize effectively still preserving good correction of aberrations.

Other objects of the invention will become apparent from the following description of embodiments thereof.

BRIEF DESCRIPTION OF THE DRAWINGS

FIG. 3 is a lens block diagram of a third specific embodiment of the invention.

FIGS. 4(a), 4(b) and 4(c) illustrate the various aberrations of the lens of FIG. 1 at the wide angle end, intermediate position and telephoto end, respectively.

FIGS. 5(a), 5(b) and 5(c) illustrate the various aberrations of the lens of FIG. 2 at the wide angle end, intermediate position and telephoto end, respectively.

FIGS. 6(a), 6(b) and 6(c) illustrate the various aberrations of the lens of FIG. 3 at the wide angle end, intermediate position and telephoto end, respectively.

DETAILED DESCRIPTION OF THE PREFERRED EMBODIMENTS

Figure 1:
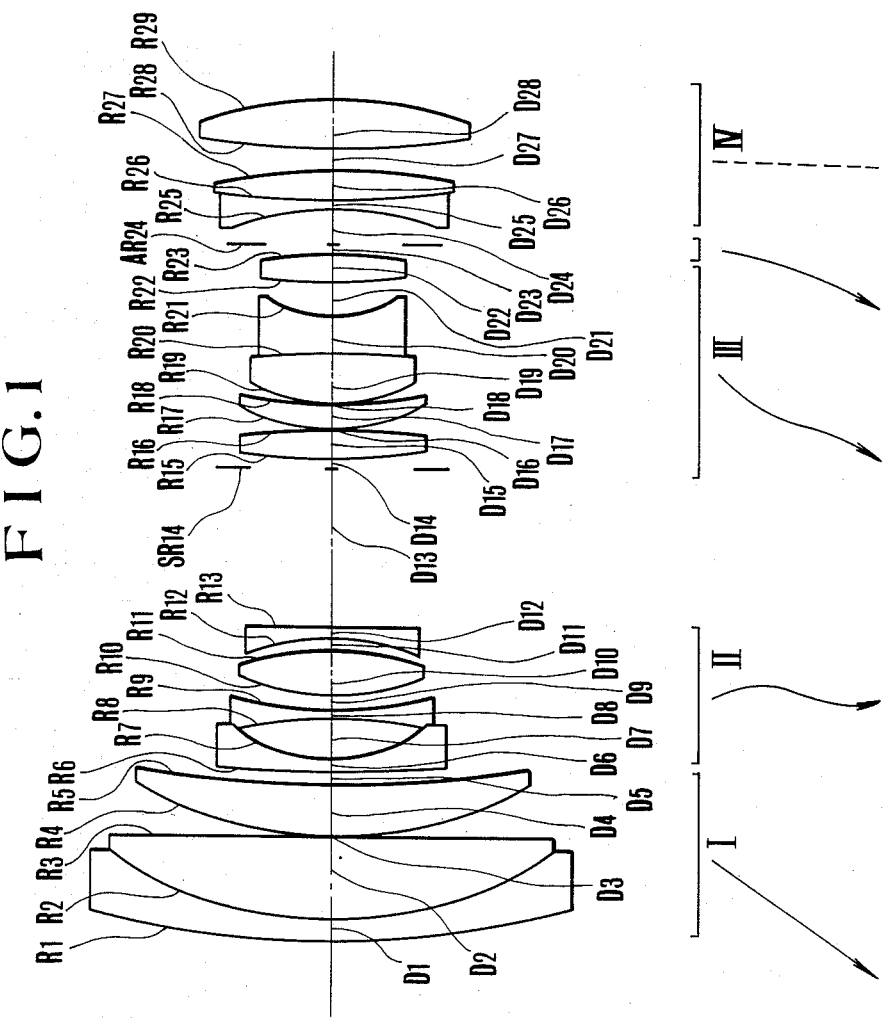
FIG. 1 is a lens block diagram of a first specific embodiment of the invention.

A feature of the invention is the construction of a zoom lens including a first component counting from the front having a positive refractive power, a second component having a negative refractive power, and a third component having a positive refractive power. A first air separation between the first and second components and a second air separation between the second and third components vary to effect zooming. The third component consists of a front member having a positive refractive power, a middle member having a negative refractive power and a rear member having a positive refractive power. The front member of the third component consists of at least two positive lenses, the middle member consists of a meniscus lens of negative power having a divergent cemented surface with a convex curvature toward the front, and the rear member consists of at least one lens of positive power with its rear surface having a stronger curvature.

The present invention achieves its primary object with the above-described system. It is however, further preferred that the middle member is a doublet consisting of a bi-convex lens and a bi-concave lens cemented at their adjoining surfaces, and the rear member is constructed with one lens, the following condition being satisfied:

$$0.1 < Nv - Np < 0.35 \tag{1}$$

where Np and Nv are the refractive indices of the glasses of the bi-convex and bi-concave lenses of the middle member, respectively.

When the zoom lens of the invention fulfills the general requirement that the third component have three constituent parts of positive, negative and positive powers, improved aberration correction is achieved. Specifically, the negative spherical aberration and the coma produced from the positive member are corrected by the negative member. The negative longitudinal and lateral chromatic aberrations produced from the positive member are also corrected by the negative member. Further, the astigmatism and the field curvature are corrected by the positive and negative members. When the front member consists of at least two positive lenses, the various aberrations produced from this member, particularly spherical aberration and coma, are minimized.

A second specific requirement that the member is constructed with a negative meniscus doublet of forward convexity having a diverging cemented surface, various aberrations such as spherical aberration and coma produced by the positive member of the third component are corrected by the cemented surface and the concave rear surface. If this middle member is constructed of a positive singlet and negative singlet, the rear surface of the positive singlet and the front surface of the negative singlet are liable to produce aberrations of higher order which have to be corrected by other lens surfaces. Therefore, it is advantageous if the middle member is a cemented lens as in the present invention.

Moreover, while the two lenses of the middle member may be separately installed in a lens barrel, since errors in alignment of these two lenses can adversely affect the various aberrations, it is preferable to cement these two lenses together beforehand in an accurate positioned relation and then to install this now formed middle member as a unit in the lens barrel.

When condition (1) is satisfied, the field curvature particularly can be well corrected. The factor (Nv−Np) concerns the Petzval sum. When the lower limit is exceeded, the Petzval sum is small. When the upper limit is exceeded, the Petzval sum is large. In either case, the field curvature is difficult to correct.

Specific numerical examples of the zoom lens of the invention follow. In the numerical data, tables Ri is the radius of curvature of the i-th lens surface counting from the front; Di is the i-th lens thickness or air space counting from the front; and Ni and $\nu i$ are, respectively the refractive index and the Abbe number of the glass of the i-th lens element counting from the front.

Figure 2:
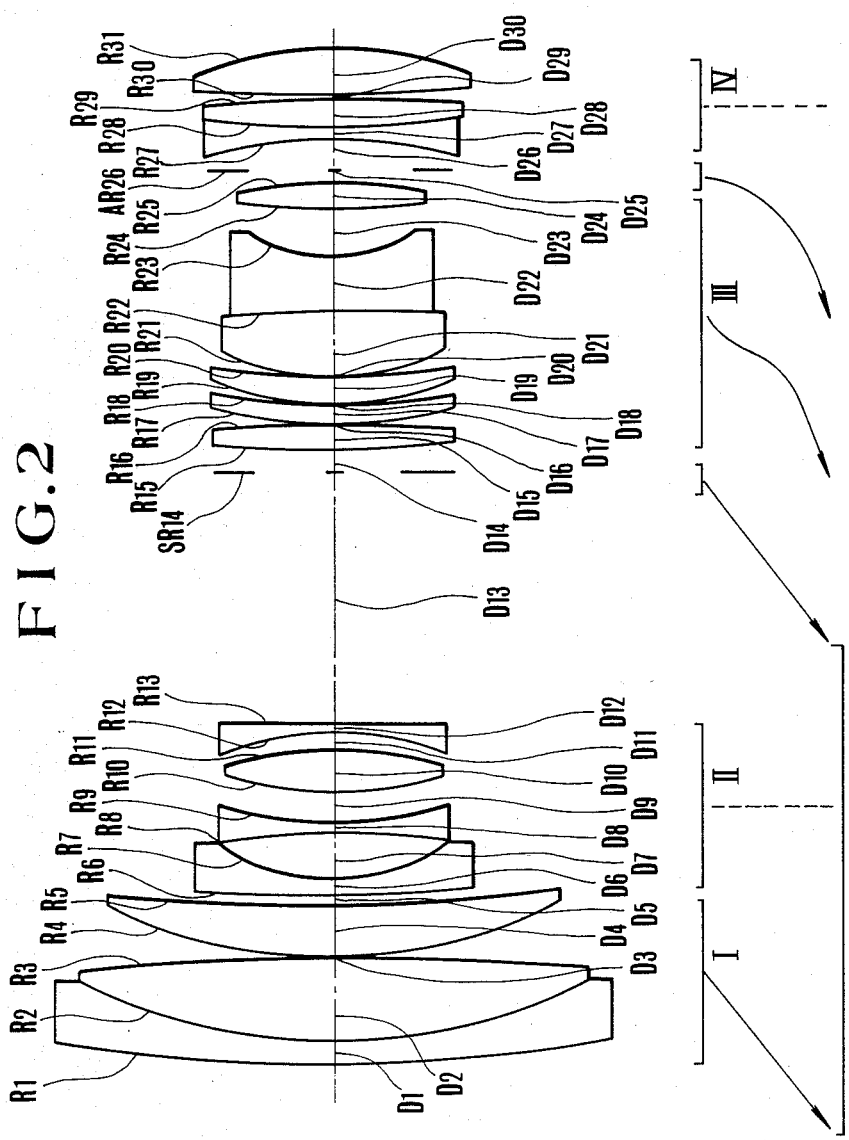
FIG. 2 is a lens block diagram of a second specific embodiment of the invention.

In FIGS. 1 to 3, I, II, III, IV and V denote the first, second, third, fourth and fifth lens components respectively, and arrows indicate the paths of zooming movement of all zoom components. In FIGS. 4 to 6, M denotes the meridional image surface and S the sagittal image surface.

| Example 1 |
|---|
| F = 36–102    FNO = 1:3.5–4.6    2ω = 62°–24° |

| | | | |
|---|---|---|---|
| R1 = 118.592 | D1 = 2.50 | N1 = 1.80518 | $\nu1$ = 25.4 |
| R2 = 49.747 | D2 = 9.00 | N2 = 1.60311 | $\nu2$ = 60.7 |
| R3 = −719.998 | D3 = 0.12 | | |
| R4 = 46.718 | D4 = 5.90 | N3 = 1.69680 | $\nu3$ = 55.5 |
| R5 = 221.557 | D5 = Variable | | |
| R6 = 131.328 | D6 = 1.20 | N4 = 1.88300 | $\nu4$ = 40.8 |
| R7 = 17.626 | D7 = 4.80 | | |
| R8 = −52.895 | D8 = 1.00 | N5 = 1.88300 | $\nu5$ = 40.8 |
| R9 = 62.652 | D9 = 1.85 | | |
| R10 = 35.284 | D10 = 4.80 | N6 = 1.84666 | $\nu6$ = 23.9 |
| R11 = −31.841 | D11 = 1.35 | | |
| R12 = −24.835 | D12 = 1.00 | N7 = 1.83400 | $\nu7$ = 37.2 |
| R13 = −260.777 | D13 = Variable | | |
| SR14 = 0.0 | D14 = 1.00 | | |
| R15 = 77.954 | D15 = 3.20 | N8 = 1.77250 | $\nu8$ = 49.6 |
| R16 = −87.117 | D16 = 0.38 | | |
| R17 = 22.389 | D17 = 2.70 | N9 = 1.59551 | $\nu9$ = 39.2 |
| R18 = 50.045 | D18 = 0.14 | | |
| R19 = 20.013 | D19 = 5.71 | N10 = 1.51742 | $\nu10$ = 52.4 |
| R20 = −185.087 | D20 = 4.45 | N11 = 1.84666 | $\nu11$ = 23.9 |
| R21 = 14.513 | D21 = 3.87 | | |
| R22 = 79.837 | D22 = 3.00 | N12 = 1.67003 | $\nu12$ = 47.3 |
| R23 = −48.218 | D23 = Variable | | |
| AR24 = 0.0 | D24 = Variable | | |
| R25 = −39.695 | D25 = 1.20 | N13 = 1.77250 | $\nu13$ = 49.6 |
| R26 = 136.657 | D26 = 2.90 | N14 = 1.51742 | $\nu14$ = 52.4 |
| R27 = −88.781 | D27 = 2.49 | | |
| R28 = 95.553 | D28 = 5.40 | N15 = 1.62299 | $\nu15$ = 58.2 |
| R29 = −52.956 | | | |

| F | 36 | 60.14 | 102 |
|---|---|---|---|
| D5 | 1.02 | 11.55 | 19.83 |
| D13 | 17.37 | 9.59 | 1.0 |
| D23 | 1.11 | 5.18 | 6.48 |
| D24 | 4.0 | 7.72 | 15.0 |

| Example 2 |
|---|
| F = 36–131.1    FNO = 1:4.1    2ω = 62°–18.7° |

| | | | |
|---|---|---|---|
| R1 = 203.976 | D1 = 2.50 | N1 = 1.80518 | $\nu1$ = 25.4 |
| R2 = 67.066 | D2 = 9.01 | N2 = 1.69680 | $\nu2$ = 55.5 |
| R3 = −353.880 | D3 = 0.12 | | |
| R4 = 55.758 | D4 = 5.53 | N3 = 1.69680 | $\nu3$ = 55.5 |
| R5 = 184.608 | D5 = Variable | | |
| R6 = 235.238 | D6 = 1.50 | N4 = 1.88300 | $\nu4$ = 40.8 |
| R7 = 23.487 | D7 = 5.04 | | |
| R8 = −75.474 | D8 = 1.20 | N5 = 1.80400 | $\nu5$ = 46.6 |
| R9 = 47.273 | D9 = 3.27 | | |
| R10 = 40.714 | D10 = 4.88 | N6 = 1.80518 | $\nu6$ = 25.4 |
| R11 = −46.433 | D11 = 1.86 | | |
| R12 = −34.117 | D12 = 0.90 | N7 = 1.79952 | $\nu7$ = 42.2 |
| R13 = −427.842 | D13 = Variable | | |
| SR14 = 0.0 | D14 = Variable | | |
| R15 = 143.647 | D15 = 2.50 | N8 = 1.72000 | $\nu8$ = 50.2 |
| R16 = −220.374 | D16 = 0.12 | | |
| R17 = 57.016 | D17 = 2.50 | N9 = 1.65844 | $\nu9$ = 50.9 |
| R18 = 123.461 | D18 = 0.12 | | |

-continued

| Example 2 |
|---|

| | | | |
|---|---|---|---|
| R19 = 33.272 | D19 = 3.03 | N10 = 1.62004 | $\nu10$ = 36.3 |
| R20 = 75.701 | D20 = 0.12 | | |
| R21 = 24.716 | D21 = 7.35 | N11 = 1.51742 | $\nu11$ = 52.4 |
| R22 = −241.028 | D22 = 5.57 | N12 = 1.84666 | $\nu12$ = 23.9 |
| R23 = 18.530 | D23 = 5.36 | | |
| R24 = 96.485 | D24 = 2.68 | N13 = 1.66672 | $\nu13$ = 48.3 |
| R25 = −54.371 | D25 = Variable | | |
| AR26 = 0.0 | D26 = Variable | | |
| R27 = −50.660 | D27 = 1.40 | N14 = 1.77250 | $\nu14$ = 49.6 |
| R28 = 153.277 | D28 = 2.25 | N15 = 1.56965 | $\nu15$ = 49.4 |
| R29 = −347.010 | D29 = 0.60 | | |
| R30 = 141.986 | D30 = 4.79 | N16 = 1.64850 | $\nu16$ = 53.0 |
| R31 = −50.727 | | | |

| F | 36 | 69.96 | 131.06 |
|---|---|---|---|
| D5 | 1.42 | 15.87 | 26.54 |
| D13 | 27.48 | 13.04 | 2.36 |
| D14 | 2.5 | 3.22 | 0.82 |
| D25 | 1.26 | 8.97 | 9.76 |
| D26 | 3.7 | 9.72 | 22.0 |

| Example 3 |
|---|
| F = 36–131    FNO = 1:4.1    2ω = 62°–18.8° |

| | | | |
|---|---|---|---|
| R1 = 138.348 | D1 = 2.50 | N1 = 1.80518 | $\nu1$ = 25.4 |
| R2 = 59.235 | D2 = 8.60 | N2 = 1.60311 | $\nu2$ = 60.7 |
| R3 = −708.983 | D3 = 0.12 | | |
| R4 = 57.659 | D4 = 5.70 | N3 = 1.69680 | $\nu3$ = 55.5 |
| R5 = 265.892 | D5 = Variable | | |
| R6 = 323.585 | D6 = 1.50 | N4 = 1.88300 | $\nu4$ = 40.8 |
| R7 = 22.256 | D7 = 4.88 | | |
| R8 = −70.172 | D8 = 1.20 | N5 = 1.80400 | $\nu5$ = 46.6 |
| R9 = 54.050 | D9 = 3.04 | | |
| R10 = 41.696 | D10 = 5.00 | N6 = 1.80518 | $\nu6$ = 25.4 |
| R11 = −41.442 | D11 = 0.87 | | |
| R12 = −34.082 | D12 = 1.20 | N7 = 1.79952 | $\nu7$ = 42.2 |
| R13 = −721.294 | D13 = Variable | | |
| R14 = 99.974 | D14 = 3.50 | N8 = 1.67003 | $\nu8$ = 47.3 |
| R15 = −80.231 | D15 = 1.20 | N9 = 1.80400 | $\nu9$ = 46.6 |
| R16 = −187.247 | D16 = 1.50 | | |
| R17 = 0.0 | D17 = 0.50 | | |
| R18 = 62.327 | D18 = 2.50 | N10 = 1.71300 | $\nu10$ = 53.8 |
| R19 = 117.949 | D19 = 0.12 | | |
| R20 = 31.707 | D20 = 3.30 | N11 = 1.62004 | $\nu11$ = 36.3 |
| R21 = 74.670 | D21 = 0.12 | | |
| R22 = 25.329 | D22 = 6.80 | N12 = 1.51742 | $\nu12$ = 52.4 |
| R23 = −197.354 | D23 = 5.50 | N13 = 1.84666 | $\nu13$ = 23.9 |
| R24 = 18.719 | D24 = 5.12 | | |
| R25 = 65.205 | D25 = 3.40 | N14 = 1.66672 | $\nu14$ = 48.3 |
| R26 = −48.987 | D26 = Variable | | |
| R27 = −32.563 | D27 = 1.20 | N15 = 1.77250 | $\nu15$ = 49.6 |
| R28 = 3199.093 | D28 = 3.10 | N16 = 1.57957 | $\nu16$ = 53.7 |
| R29 = −37.012 | D29 = Variable | | |
| R30 = −71.021 | D30 = 2.80 | N17 = 1.58913 | $\nu17$ = 61.0 |
| R31 = −41.935 | | | |

| F | 36 | 70.02 | 131 |
|---|---|---|---|
| D5 | 1.83 | 16.13 | 28.2 |
| D13 | 27.14 | 12.84 | 0.77 |
| D26 | 1.76 | 10.0 | 14.19 |
| D29 | 2.5 | 8.55 | 16.44 |

Example 1 concerns a type of zooming where the first, second and third components I, II and III are moved in differential relation to one another. The fourth component IV is held stationary during zooming. A stopper AR24 changes its axial position independently of any of the zoom components during zooming, so that the off-axis aberrations and particularly flare are removed.

Example 2 concerns another type of zooming where the first and third components I and III are moved in differential relation to each other. The second and fourth components II and IV remain stationary during zooming. A stop SR14 moves as a unit with the first component I, giving the advantage that the structure of the lens mounting mechanism is simplified. Specifically, when the stop SR14 moves in unison with the first lens components but independently of those components that follow the first component, in the case of the one-ring type mechanical mounting, it is possible to transmit the axial movement of the zoom ring directly to the diaphragm mechanism. Therefore, when zooming, the diaphragm mechanism is easily moved axially without necessitating rotation of it and the operating mechanism is simple. Additionally, in Example 2, if stopper AR26 is moved axially independently of the other lens components during zooming, good aberration correction and a decrease in the outer diameter of the first lens component is possible.

Example 3 is another type of zooming where the first, third and fourth components I, III and IV are moved. The second and fifth lens components II and V remain stationary during zooming. In this example, the first and third lens components I and III move as a unit.

As has been described above, according to the present invention, though the refractive power of the third lens component is strengthened and its total zooming movement is extended, because the third lens component is made of a partial system which stabilizes aberrations during zooming, it is possible to provide a zoom lens of high magnification range well corrected for aberrations.

Also, according to the present invention, the principal point of the third lens component can be put on the object side. Accordingly, while the air space between the second and third lens components is minimized, or is compact, the image magnification range can be extended.

All the above-described embodiments of the invention apply to the zoom type lens where the movement of the first lens component with zooming assists in varying the magnification power of the second lens component. This type is suited for shortening the total length of the lens system at the wide angle end and also the outer diameter of the lens and, therefore, for achieving compactness. However the features of the third lens component of the invention are not confined to the above-described zoom type, lens and are effective in other types, provided that the separations between the successive two of the first, second and third lens components are variable. For example, the conventional 4-component zoom type lens in which the first lens component is held stationary during zooming and only has the focusing function, and an alternative type lens in which the third lens component is held stationary during zooming and the fourth lens component moves to indirectly vary the image magnification, may be mentioned. The principle of correcting the aberrations of the partial system for high grade imagery despite a strong refractive power is applicable to many other zoom type lenses.

What we claim:
1. A zoom lens comprising:
   from front to rear, a positive first component, a negative second component, a positive third component, and a fourth component,
   said first, second and third lens components moving differentially from each other for zooming, and
   said third component including, from front to rear, at least two positive lenses, a negative meniscus lens of forward convexity having a diverging cemented surface, and a positive lens having a rear surface of stronger curvature than the front surface.
2. A zoom lens according to claim 1, in which said fourth component is stationary during zooming.
3. A zoom lens according to claim 1, in which said fourth component is movable during zooming, and which further comprises a fifth component which is at a foremost position on the image side and stationary during zooming.
4. A zoom lens comprising:
   from front to rear, a positive first component, a negative second component, a positive third component, and a fourth component,
   a separation between said first and second components and a separation between said second and third components, said separations being variable during zooming,
   said third component including, from front to rear, at least two positive lenses, a negative meniscus lens of forward convexity having a diverging cemented surface, and a positive lens having a rear surface of stronger curvature than the front surface; and
   a diaphragm arranged, upon zooming, to move as a unit with said first component independently of those components lying on the image side of said first component.
5. A zoom lens comprising:
   from front to rear, a positive first component, a negative second component, a positive third component, and a fourth component,
   a separation between said first and second components and a separation between said second and third components, said separations being variable during zooming,
   said third component including, from front to rear, at least two positive lenses, a negative meniscus lens of forward convexity having a diverging cemented surface, and a bi-convex lens having a rear surface of stronger curvature than the front surface, and
   said meniscus lens including a bi-convex lens and a bi-concave lens satisfying the following condition:

$$0.1 < Nv - Np < 0.35$$

where Np and Nv are the refractive indices of the glasses of said bi-convex and bi-concave lens, respectively, and said first lens component and said third lens component moving together during zooming.
6. A zoom lens comprising:
   from front to rear, a positive first component, a negative second component, a positive third component, and a fourth component,
   a separation between said first and second components and a separation between said second and third components, said separations being variable during zooming,
   said third component including, from front to rear, at least two positive lenses, a negative meniscus lens of forward convexity having a diverging cemented surface, and a positive lens having a rear surface of stronger curvature than the front surface, and
   a stopper arranged on the image side of said third component moving independently from said third component.

* * * * *